(12) United States Patent
Alarcon (10) Patent No.: US 10,873,189 B2
(45) Date of Patent: *Dec. 22, 2020

(54) METHOD, SYSTEM AND DEVICE FOR CONTROLLING CHARGING OF BATTERIES IN ELECTRONIC CIGARETTES

(71) Applicant: Fontem Holdings 4 B.V., Amsterdam (NL)

(72) Inventor: Ramon Alarcon, Los Gatos, CA (US)

(73) Assignee: Fontem Holdings 4 B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/115,007

(22) Filed: Aug. 28, 2018

(65) Prior Publication Data

US 2019/0067970 A1    Feb. 28, 2019

Related U.S. Application Data

(63) Continuation of application No. 14/711,691, filed on May 13, 2015, now Pat. No. 10,090,693.

(Continued)

(51) Int. Cl.
*H02J 7/00* (2006.01)
*A24F 47/00* (2020.01)
*H02J 7/34* (2006.01)

(52) U.S. Cl.
CPC ............. *H02J 7/00* (2013.01); *A24F 47/008* (2013.01); *H02J 7/0042* (2013.01); *H02J 7/345* (2013.01); *H02J 7/0044* (2013.01); *H02J 7/0045* (2013.01)

(58) Field of Classification Search
CPC ...................................................... H02J 7/345
(Continued)

(56) References Cited

U.S. PATENT DOCUMENTS 8,373,391 B1    2/2013   Allen et al.
9,350,181 B2 *  5/2016   Xiang ................... H02J 7/0042
(Continued)

FOREIGN PATENT DOCUMENTS

CN          1813387 A       8/2006
CN        102510641 A       6/2012
(Continued)

OTHER PUBLICATIONS

Dispennette, "Ultracapacitors Bring Portability to Power", Power Electronics, Oct. 1, 2005, 8 pages, http://www.powerelectronics.com/passive-components/ultracapacitors-bring-portability-power.

(Continued)

*Primary Examiner* — Edward Tso
*Assistant Examiner* — Ahmed H Omar
(74) *Attorney, Agent, or Firm* — Dykema Gossett PLLC (57) ABSTRACT

A system, a method, and a device for controlling charging of batteries in electronic articles, and more particularly for controlling charging of batteries in electronic cigarettes. In one embodiment, a charging system for an electronic cigarette can comprise a pack that can comprise a pack battery electrically coupled to an ultra-capacitor. The pack battery can be configured to charge the ultra-capacitor. The charging system can further comprise an electronic circuitry configured to temporarily or non-fixedly couple the pack to an electronic cigarette battery. The ultra-capacitor can be configured to charge the electronic cigarette battery at an accelerated rate as compared to a rate at which the pack battery alone can charge the electronic cigarette battery.

20 Claims, 6 Drawing Sheets

Related U.S. Application Data (60) Provisional application No. 61/992,710, filed on May 13, 2014.

(58) Field of Classification Search
USPC .................................................. 320/166, 167
See application file for complete search history.

(56) References Cited

U.S. PATENT DOCUMENTS

| | | | |
|---|---|---|---|
| 9,427,024 | B2 | 8/2016 | Liu |
| 2004/0004462 | A1 | 1/2004 | Bean et al. |
| 2008/0315829 | A1* | 12/2008 | Jones ................. H02J 7/345 |
| | | | 320/103 |
| 2009/0230117 | A1 | 9/2009 | Fernando et al. |
| 2010/0026248 | A1 | 2/2010 | Barrade et al. |
| 2011/0265806 | A1 | 11/2011 | Alarcon et al. |
| 2012/0227753 | A1 | 9/2012 | Newton |
| 2012/0280664 | A1 | 11/2012 | Wood |
| 2013/0119945 | A1* | 5/2013 | Petersen ............ H02J 7/0052 |
| | | | 320/138 |
| 2014/0060554 | A1 | 3/2014 | Collette et al. |
| 2014/0083443 | A1 | 3/2014 | Liu |
| 2014/0216484 | A1 | 8/2014 | Liu |
| 2014/0217973 | A1* | 8/2014 | Lee .................... B60L 11/1814 |
| | | | 320/109 |
| 2014/0354231 | A1 | 12/2014 | Xiang |
| 2015/0047661 | A1* | 2/2015 | Blackley ................. H05B 3/12 |
| | | | 131/329 |

FOREIGN PATENT DOCUMENTS

| | | |
|---|---|---|
| CN | 202374001 U | 8/2012 |
| CN | 203387219 U | 1/2014 |
| EP | 2 100 525 A1 | 9/2009 |
| WO | 2005/001961 A2 | 1/2005 |
| WO | 2013/138384 A2 | 9/2013 |
| WO | 2016/058904 A1 | 4/2016 |

OTHER PUBLICATIONS

Communication Under Rule 71(3) EPC dated May 24, 2019 (30 pages).

Chinese Search Report (CN 2015800288238) dated Nov. 5, 2018 (2 pages).

* cited by examiner

METHOD, SYSTEM AND DEVICE FOR CONTROLLING CHARGING OF BATTERIES IN ELECTRONIC CIGARETTES

CROSS-REFERENCE TO RELATED APPLICATIONS

This application claims the benefit of U.S. provisional application No. 61/992,710, filed 13 May 2014, which is hereby incorporated by reference as though fully set forth herein.

FIELD OF THE DISCLOSURE

The present disclosure relates to a system, a method, and a device for charging the batteries of electronic articles, and more particularly for charging the batteries in an electronic cigarette.

BACKGROUND OF THE DISCLOSURE

Electronic cigarettes, also known as e-cigarette (eCigs) and personal vaporizers (PVs), are electronic inhalers that vaporize or atomize a liquid solution into an aerosol mist that may then be delivered to a user. A typical eCig has two main parts—a housing holding a battery and a cartomizer. The housing holding the battery typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

For safety reasons, the rechargeable battery is not directly connected to external contacts. Instead, a diode and a field effect transistor (FET) are connected in series with the battery connection. When a FET is used, the FET is turned on once a charging process is detected for the eCig. The eCig may be charged by placing the eCig in a charging station that is configured to receive the particular eCig. The charging station may include a charging circuit that is configured to supply power to the eCig to charge the battery.

SUMMARY OF THE DISCLOSURE

The present disclosure provides systems, methods, devices, and computer programs for charging the batteries of electronic articles, and more particularly for charging the batteries in an electronic cigarette.

According to one non-limiting example of the disclosure, a system, a method, a device for charging the batteries of electronic articles, and more particularly for charging the batteries in an electronic cigarette.

In one embodiment, a charging system for an electronic cigarette can comprise a pack that can comprise a pack battery electrically coupled to an ultra-capacitor. The pack battery can be configured to charge the ultra-capacitor. The charging system can further comprise an electronic circuitry configured to temporarily or non-fixedly couple the pack to an electronic cigarette battery. The ultra-capacitor can be configured to charge the electronic cigarette battery at an accelerated rate as compared to a rate at which the pack battery alone can charge the electronic cigarette battery.

In another embodiment, a charging system can comprise a pack that can comprise a pack battery, and an electronic cigarette that can comprise an electronic cigarette battery, an ultra-capacitor, and a constant voltage converter. The pack can further comprise an electronic circuitry that can be configured to temporarily or non-fixedly couple the pack to the electronic cigarette battery. The ultra-capacitor can be configured to charge the electronic cigarette battery at an accelerated rate as compared to a rate at which the pack battery alone can charge the electronic cigarette battery.

Additional features, advantages, and embodiments of the disclosure may be set forth or apparent from consideration of the detailed description and drawings. Moreover, it is to be understood that the foregoing summary of the disclosure and the following detailed description, drawings, and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1A:
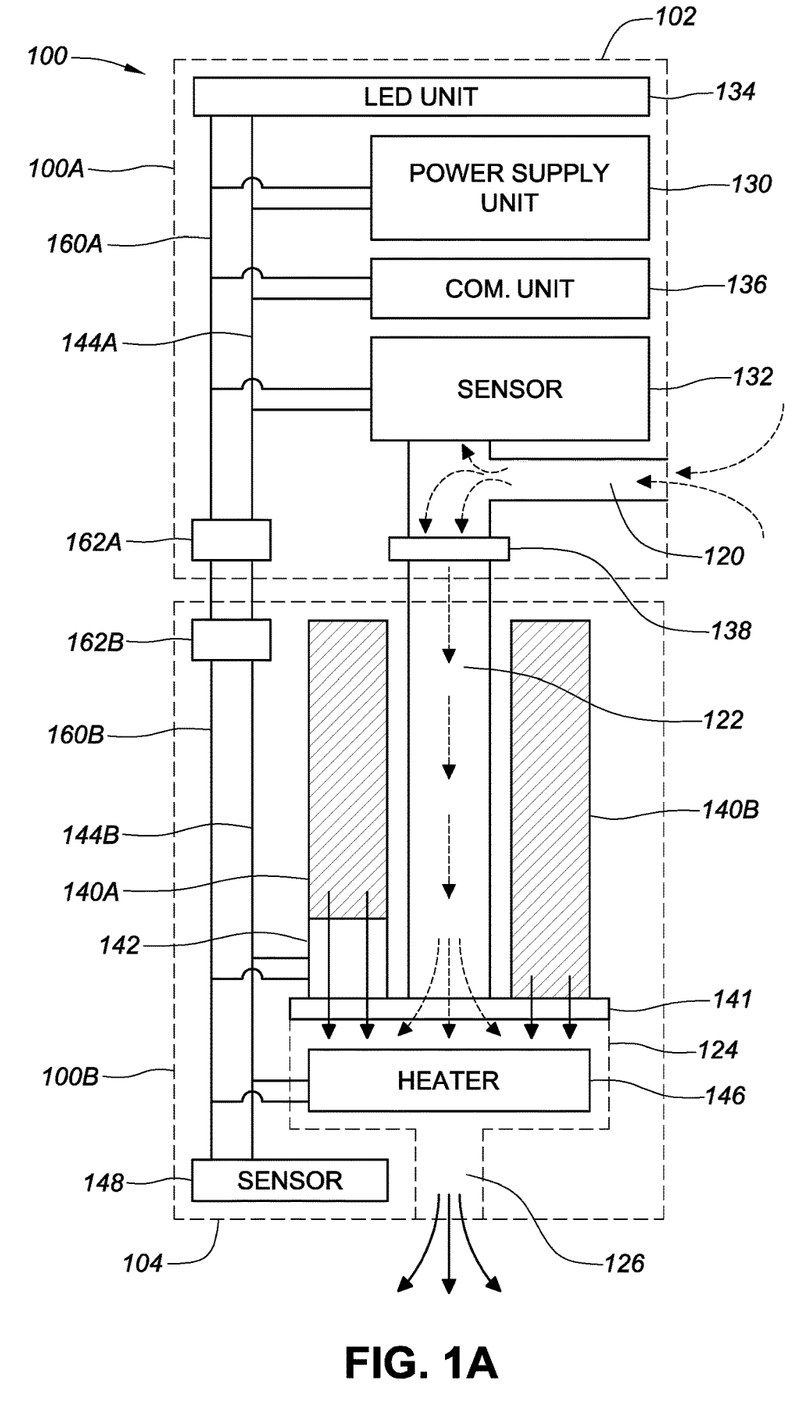
FIG. 1A depicts a structural overview of an electronic smoking device constructed according to the principles of the disclosure.
Figure 2:
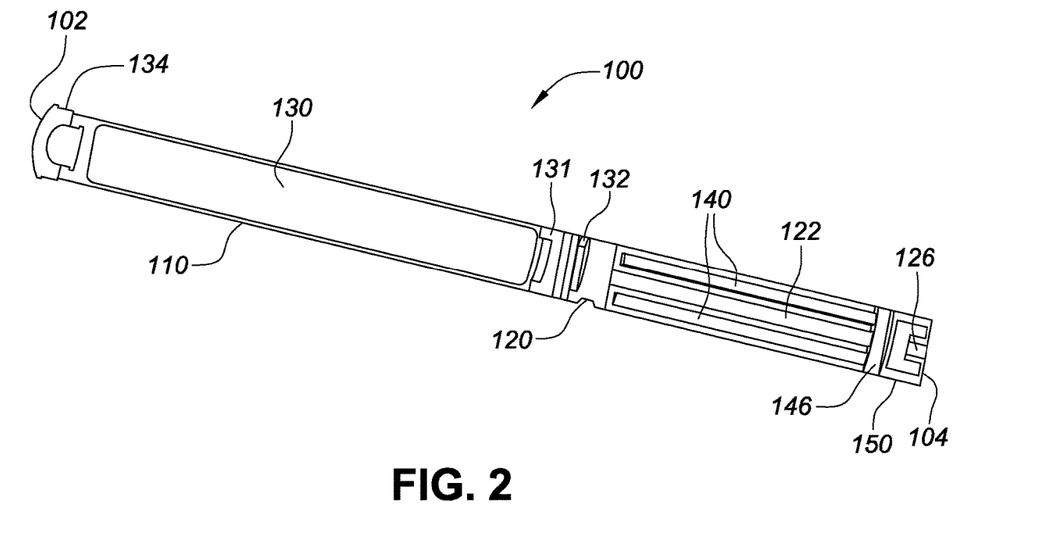
FIG. 2 is a cross-section view of a design of the electronic smoking devices shown in FIGS. 1A and 1B.

FIG. 1A shows a structural overview of an electronic cigarette (eCig) 100 constructed according to the principles of the disclosure. The eCig 100 may be disposable or reusable. The eCig 100 may have a multi-body construction including two or more bodies. For example, the eCig 100 may be a reusable eCig including a first body 100A and a second body 100B and/or the like, that may be easily connected to and disconnected from each other anytime without using any special tools. For example, each body may include threaded parts. Each body may be covered by a different housing. The second body 100B may contain consumable material, such as, e.g., smoking liquid and/or the like. When the consumable material is fully consumed, the second body 100B may be disconnected from the first body 100A and replaced with a new one. Also, the replacement second body 100B may be a different flavor, strength, type and/or the like. Alternatively, the eCig 100 may have a single body construction, as shown in FIG. 2. Regardless of the construction type, the eCig 100 may have an elongated shape with a first end 102 and a second end 104, as shown in FIG. 2, which may be similar to a conventional cigarette shape. Other non-conventional cigarette shapes are also contemplated. For example, the eCig 100 may have a smoking pipe shape or the like.

The eCig 100 may include an air inlet 120, an air flow path 122, a vaporizing chamber 124, a smoke outlet 126, a power supply unit 130, a sensor 132, a container 140, a dispensing control device 141, a heater 146, and/or the like. Further, the eCig 100 may include a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, which is explained below in detail with reference to FIG. 1B. The air inlet 120 may extend from, for example, an exterior surface of the housing 110 as shown in FIG. 2. The air flow path 122 may be connected to the air inlet 120 and extending to the vaporizing chamber 124. The smoke outlet 126 may be connected to the vaporizing chamber 124. The smoke outlet 126 may be formed at the second end 104 of the eCig 100 and connected to the vaporizing chamber 124. When a user sucks the second end 104 of the eCig 100, air outside the air inlet 120 may be pulled in and moved to the vaporizing chamber 124 via the air flow path 122, as indicated by the dotted arrows in FIG. 1A. The heater 146 may be a solid state heater shown in FIG. 5 or the like, and located in the vaporizing chamber 124. The container 140 may contain the smoking liquid and connected to the vaporizing chamber 124. The container 140 may have an opening connected to the vaporizing chamber 124. The container 140 may be a single container or a group of containers, such as, e.g., containers 140A, 140B and the like, that are connected to or separated from each other.

The dispensing control device 141 may be connected to the container 140 in order to control flow of the smoking liquid from the container 140 to the vaporizing chamber 124. When the user is not smoking the eCig 100, the dispensing control device 141 may not dispense the smoking liquid from the container 140. The dispensing control device 141 may not need any electric power from, for example, the power supply unit 130 and/or the like, for operation.

The power supply unit 130 may be connected to one or more components that require electric power, such as, e.g., the sensor 132, the heater 146, and the like, via a power bus 160. The power supply unit 130 may include a battery (not shown), such as, e.g., a rechargeable battery, a disposable battery and/or the like. The power unit 130 may further include a power control logic (not shown) for carrying out charging of the battery, detecting the battery charge status, performing power save operations and/or the like. The power supply unit 130 may include a non-contact inductive recharging system such that the eCig 100 may be charged without being physically connected to an external power source. A contact charging system is also contemplated The sensor 132 may be configured to detect the user's action for smoking, such as, e.g., sucking of the second end 104 of the eCig 100, touching of a specific area of the eCig 100 and/or the like. When the user's action for smoking is detected, the sensor 132 may send a signal to other components via a data bus 144. For example, the sensor 132 may send a signal to turn on the heater 146. Also, the sensor 132 may send a signal to the active dispensing device 142 (if utilized) to dispense a predetermined amount of the smoking liquid to the vaporizing chamber 124. When the smoking liquid is dispensed from the container 140 and the heater 146 is turned on, the smoking liquid may be mixed with the air from the air flow path 122 and vaporized by the heat from the heater 146 within the vaporizing chamber 124. The resultant vapor (i.e., smoke) may be pulled out from the vaporizing chamber 144 via the smoke outlet 126 for the user's oral inhalation, as indicated by solid arrows in FIG. 1A. In order to prevent the smoke generated in the vaporizing chamber 144 from flowing towards the air inlet 120, the air flow path 122 may include a backflow prevention screen or filter 138.

When the user's action for smoking is stopped, the sensor 132 may send another signal to turn off the heater 146, the active dispensing device 142, and/or the like, and vaporization and/or dispensing of the smoking liquid may stop immediately. In an alternative embodiment, the sensor 132 may be connected only to the power supply unit 130. When the user's action for smoking is detected, the sensor 132 may send a signal to the power supply unit 130. In response to the signal, the power supply unit 130 may turn on other components, such as, e.g., the heater 146 and the like, to vaporize the smoking liquid.

In an embodiment, the sensor 132 may be an air flow sensor. For example, the sensor 132 may be connected to the air inlet 120, the air flow path 122, and/or the like, as shown in FIG. 1A. When the user sucks the second end 104 of the eCig 100, some of the air pulled in from the air inlet 120 may be moved towards the sensor 132, which may be detected by the sensor 132. Additionally or alternatively, a capacitive sensor 148 may be used to detect the user's touching of a specific area of the housing 100. For example, the capacitive sensor 148 may be formed at the second end 104 of the eCig 100. When the eCig 100 is moved to the user's mouth and the user's lip touches the second end 104, a change in capacitance may be detected by the capacitive sensor 148, and the capacitive sensor 148 may send a signal to activate the heater 146 and the like. Other types of sensors are also contemplated for detecting the user's action for smoking, including, for example, an acoustic sensor, a pressure sensor, a touch sensor, an optical sensor, a Hall Effect sensor, an electromagnetic field sensor, and/or the like.

The eCig 100 may further include a communication unit 136 for wired (e.g., Serial Peripheral Interface or the like) and/or wireless communications with other devices, such as, e.g., a pack 200 (not shown) for the eCig 100, a computer 310 (not shown) and/or the like. The communication unit 136 may also connect the eCig 100 to a wired network (e.g., LAN, WAN, Internet, Intranet and/or the like) and/or a wireless network (e.g., a WIFI network, a Bluetooth network, a cellular data network and/or the like). For example, the communication unit 136 may send usage data, system diagnostics data, system error data, and/or the like to the pack, the computer, and/or the like. To establish wireless communication, the communication unit 136 may include an antenna and/or the like. The eCig 100 may include a terminal 162 for wired communication. The terminal 162 may be connected to another terminal, such as, e.g., a cigarette connector of the pack or the like, in order to exchange data. The terminal 140 may also be used to receive power from the pack or other external power source and recharge the battery in the power supply unit 130.

When the eCig 100 has a multi-body construction, the eCig 100 may include two or more terminals 162 to establish power and/or data connection therebetween. For example, in FIG. 1A, the first body 100A may include a first terminal 162A and the second body 100B may include a second terminal 162B. The first terminal 162A may be connected to a first power bus 160A and a first data bus 144A. The second terminal 162B may be connected to a second power bus 160B and a second data bus 144B. When the first and second bodies 100A and 100B are connected to each other, the first and second terminals 162A and 162B may be connected to each other. Also, the first power bus 160A and the first data bus 144A are connected to the second power bus 160B and the second data bus 144B, respectively. To charge the battery in the power supply unit 130, exchange data and/or the like, the first body 100A may be disconnected from the second body 100B and connected to the pack or the like, which may, in turn, connect the first terminal 162A to the cigarette connector 216 of the pack or the like. Alternatively, a separate terminal (not shown) may be provided to the eCig 100 for charging and/or wired communications with an external device.

The eCig 100 may further include one or more user interface devices, such as, e.g., an LED unit 134, a sound generator (not shown), a vibrating motor (not shown), and/or the like. The LED unit 134 may be connected to the power supply unit 130 via the power bus 160A and the data bus 144A, respectively. The LED unit 134 may provide a visual indication when the eCig 100 is operating. Additionally, when there is an issue and/or problem within the eCig 100, the integrated sensor/controller circuit 132 may control the LED unit 134 to generate a different visual indication. For example, when the container 140 is almost empty or the battery charge level is low, the LED unit 134 may blink in a certain pattern (e.g., blinking with longer intervals for thirty seconds). When the heater 146 is malfunctioning, the heater 146 may be disabled and control the LED unit 134 may blink in a different pattern (e.g., blinking with shorter intervals for one minute). Other user interface devices may be used to show a text, image, and/or the like, and/or generate a sound, a vibration, and/or the like.

Figure 1B:
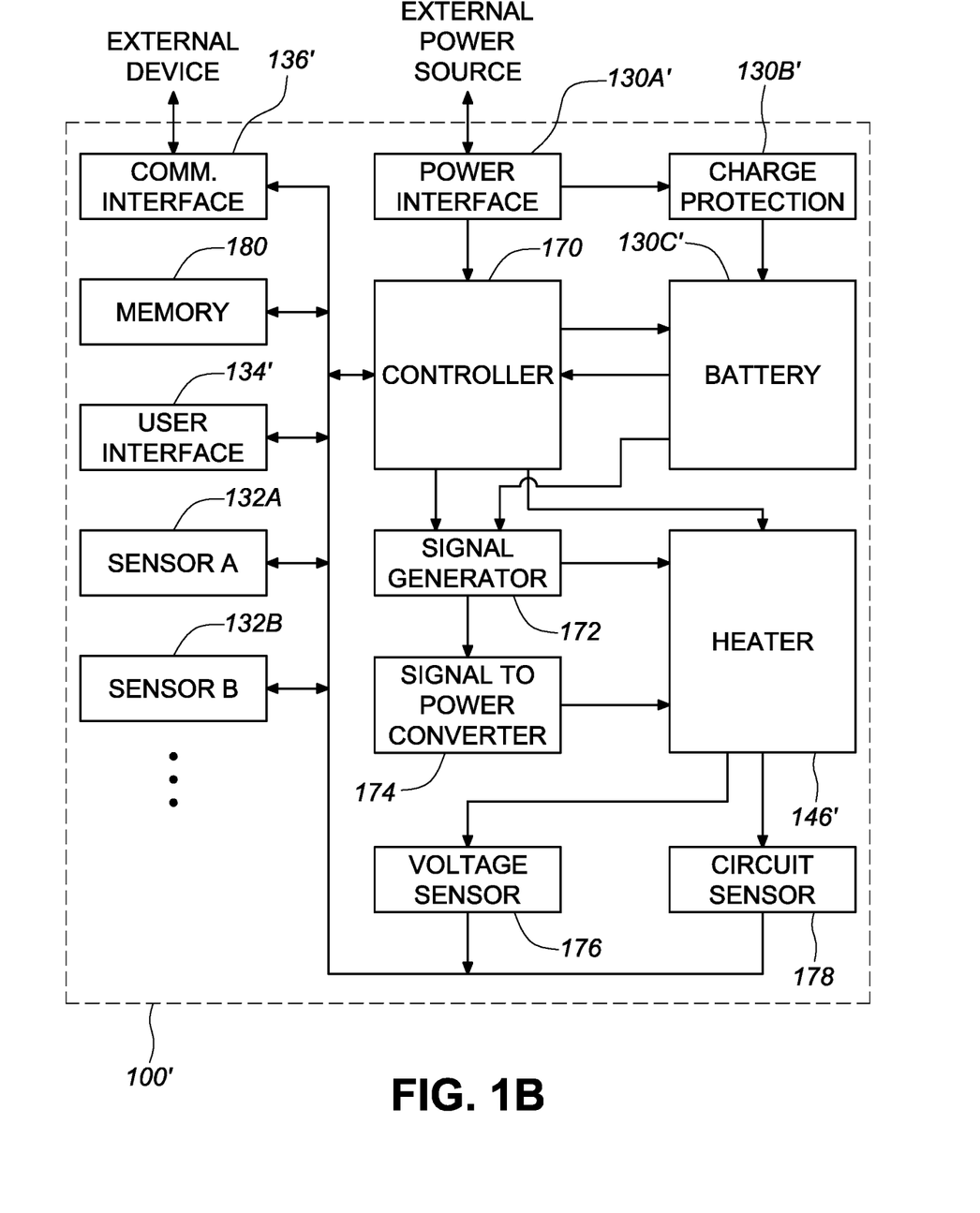
FIG. 1B depicts a schematic overview of another aspect of the electronic smoking device constructed according to the principles of the disclosure.

In the eCig 100 shown in FIG. 1A, the sensor 132 alone may not be able to control the user interface devices, the communication unit 136, the sensors 132 and 148 and/or the like. Furthermore, it may not be possible to carry out more complex and sophisticated operations with the sensor 132 alone. Thus, as noted above, a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, may be included the eCig 100. For example, FIG. 1B shows a structural overview of another eCig 100' constructed according to the principles of the disclosure. The eCig 100' may include a controller 170, a signal generator 172, a signal to power converter 174, a voltage sensor 176, a current sensor 178, a memory 180, and/or the like. Further, the eCig 100' may include a power interface 130A', a charge/discharge protection circuit 130B', a battery 130C', one or more sensors (e.g., sensor 132A, sensor 132B and/or the like), a user interface 134', a communication interface 136', a heater 146' and/or the like, which may be similar to the components of the eCig 100 shown in FIG. 1A. Two or more components may be integrated as a single chip, a logic module, a PCB, or the like, to reduce size and manufacturing costs and simplify the manufacturing process. For example, the controller 170 and a sensor 132A may be integrated as a single semiconductor chip.

The controller 170 may perform various operations, such as, e.g., heater calibration, heating parameter adjustment/control, dosage control, data processing, wired/wireless communications, more comprehensive user interaction, and/or the like. The memory 180 may store instructions executed by the controller 170 to operate the eCig 100' and carry out various basic and advanced operations. Further, the memory 180 may store data collected by the controller 170, such as, e.g., usage data, reference data, diagnostics data, error data, and/or the like. The charge/discharge protection circuit 130B' may be provided to protect the battery 130C' from being overcharged, overly discharged, damaged by an excessive power and/or the like. Electric power received by the power interface 130A' may be provided to the battery 130C' via the charge/discharge protection circuit 130B'. Alternatively, the controller 170 may perform the charge/discharge protection operation when the charge/discharge protection circuit 130B' is not available. In this case, the electric power received by the power interface 130A' may be provided to the battery 130C' via the controller 170.

The signal generator 172 may be connected to the controller 170, the battery 130C' and/or the like, and may configured to generate a power control signal, such as, e.g., a current level signal, a voltage level signal, a pulse-width modulation (PWM) signal and the like, to control the power supplied to the heater 146'. Alternatively, the power control signal may be generated by the controller 170. The converter 174 may be connected to the signal generator 172 or the controller 170 to convert the power control signal from the signal generator 172 to an electrical power provided to the heater 146. With this configuration, the power from the battery 130C' may be transferred to the heater 146' via the signal generator 172 or via the signal generator 172 and the converter 174. Alternatively, the power from the battery 130C' may be transferred to the signal generator 172 via the controller 170 and transferred to the heater 146 directly or via the signal to power converter 174.

The voltage sensor 176 and the current sensor 178 may be provided to detect an internal voltage and current of the heater 146', respectively, for heater calibration, heating parameter control and/or the like. For example, each heater 146 may have a slightly different heating temperature, which may be caused by a small deviation in resistance. To produce a more consistent unit-to-unit heating temperature, the integrated sensor/controller circuit 132 may measure a resistance of the heater 146 and adjust heating parameters (e.g., an input current level, heating duration, voltage level, and/or the like) accordingly. Also, the heating temperature of the heater 146 may change while the heater 146 is turned on. The integrated sensor 132/controller 170 circuit may monitor a change in resistance while the heater 146 is turned on and adjust the current level in a real-time basis to maintain the heating temperature at substantially the same level. Further, the integrated sensor 132/controller circuit 170 may monitor whether or not the heater 146 is overheating and/or malfunctioning, and disable the heater 146 for safety purposes when the heating temperature is higher than a predetermined temperature range and/or the heater 146 or other component is malfunctioning.

Figure 3:
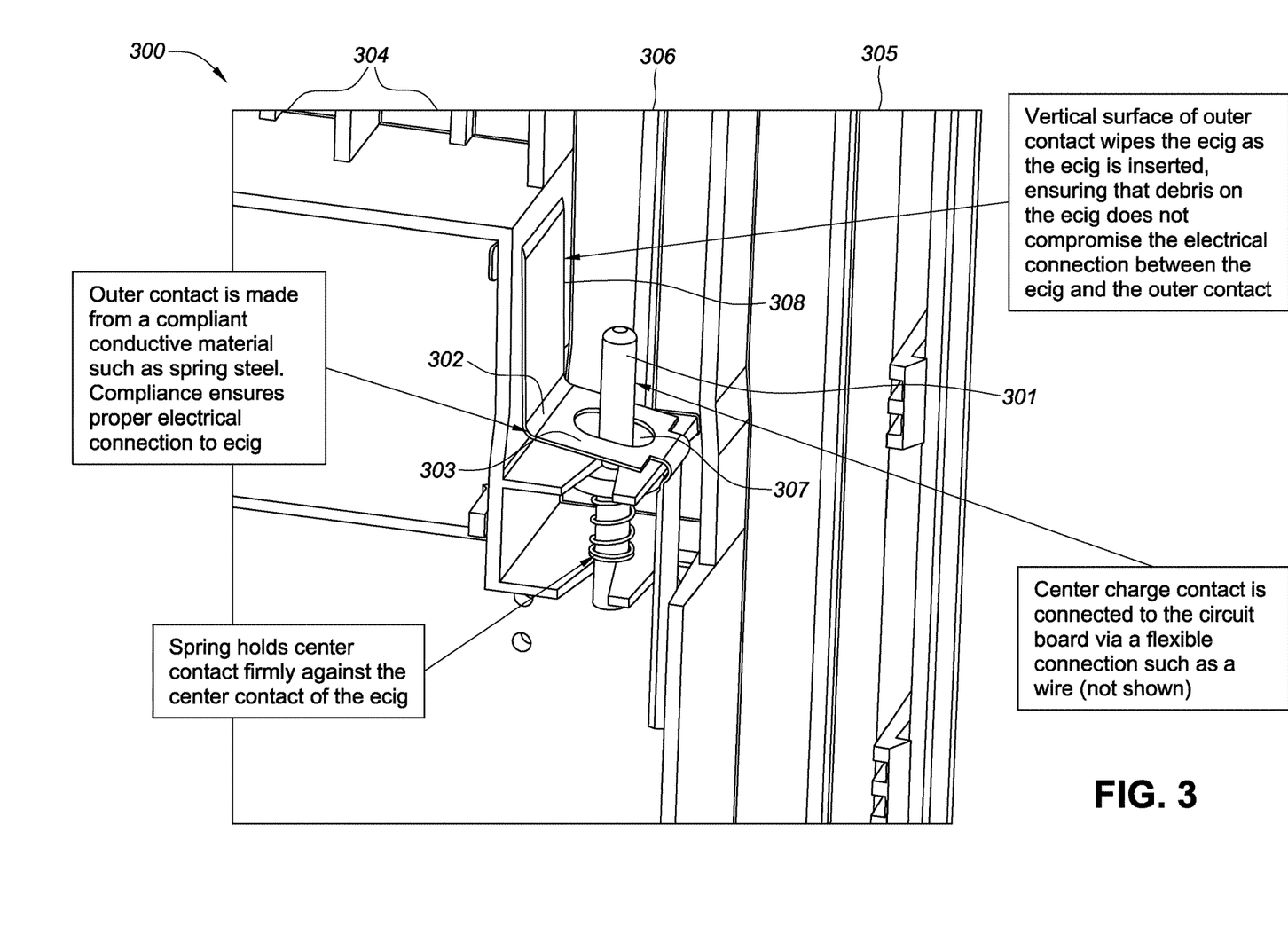
FIG. 3 is a fragmentary, isometric view of an exemplary charging system with its cover removed.

FIG. 3 illustrates an example of a charging system within a charging holder (pack) 300. Within the charging holder 300, there are several slots for a full eCig, or components of an eCig (e.g., an eCig cartridge or an eCig body, the eCig body comprising, for example an eCig housing and an eCig battery with or without an attached data logging device or other electronics). In this example, an eCig cartridge can be placed in one or more of the slots 304, the full eCig can be placed in one or more of the slots 305, and the eCig body can be placed in one or more of the slots 306. When the eCig body is placed in one of the slots 306, the battery of the eCig can be charged.

In order to charge an eCig battery using a charging system (e.g., a pack, docking station, or some other modality), a reliable electrical connection must be established between the battery and the charging system. A commonly used method of establishing this reliable electrical connection is to screw the charging of the eCig battery housing into the charging system. However, a more convenient way to make the electrical connection is by using a push-in style of contact, which also has the benefit of not requiring the user do anything more than simply pushing the eCig battery housing into the charging system.

In the embodiment depicted in FIG. 3, this push-in style of contact includes a center contact 301 to provide one polarity of the charge signal and an outer contact 302 to provide the other polarity. The center contact 301 can be a spring or a pin or a spring-loaded pin, as illustrated in FIG. 3. In the embodiment depicted in FIG. 3, the spring presses the charging system's center contact 301 firmly against the first electrical contact of the eCig battery housing, thereby establishing an electrical connection between one pole of the battery and one pole of the charging system, while ensuring that electrical continuity is maintained, even if the system is jostled. The outer contact 302 of the charging system depicted in FIG. 3 can be made from a compliant conductive material, such as conductively plated spring steel. When the rechargeable battery housing is installed into the charging system, the second electrical contact rests against a top surface 303 of the outer contact 302, which includes a hole 307 through which the center contact 301 projects. The outer contact 302 is shaped so as to flex when the eCig battery housing is pushed into place in the charging system. The compliance of the outer contact 302 ensures a reliable electrical connection to the eCig battery, even during jostling, and accommodates for variations in the mechanical dimensions of the eCig battery and charging system.

Sometimes, debris or deposits can accumulate on the outer contact 302 of the eCig battery. Alternatively, debris or deposits can accumulate on the first and second electrical contacts. Such debris or deposits can inhibit the electrical connection between the eCig battery and the charging system. To address this problem, the outer contact 302 can be configured to "self-clean." For example, the vertical surface 308 of the outer contact 302 can be configured to scrape debris off the first and second electrical contacts as the eCig battery housing is pushed into the charging system, thereby removing any debris buildup at the sites of electrical connection.

Figure 4:
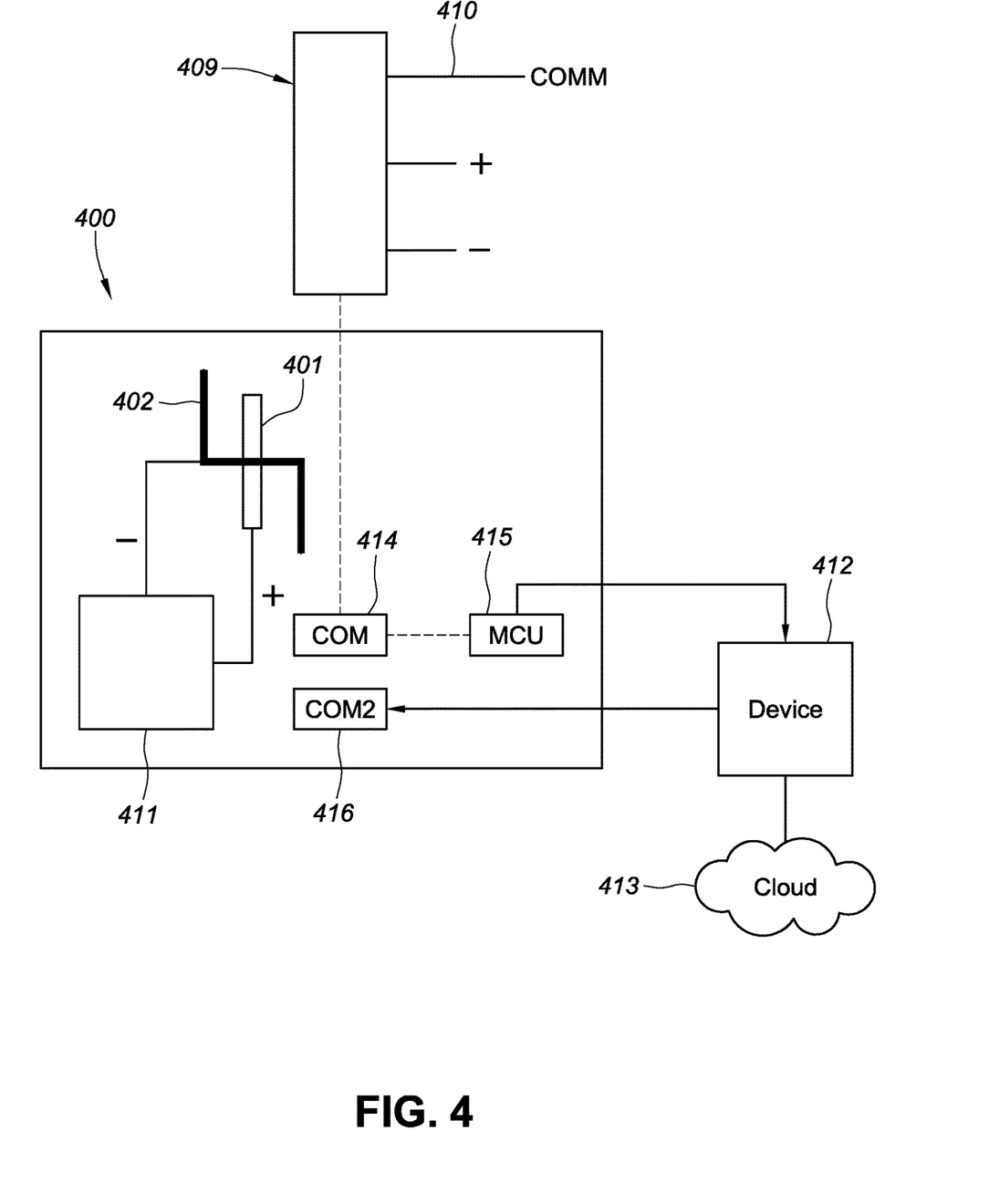
FIG. 4 is a diagram of an exemplary charging system capable of receiving and transmitting data.

FIG. 4 illustrates an embodiment of a charging system within a charging holder (pack) 400. The illustrated charging holder differs from that shown in FIG. 3 in that it includes a dedicated communication pathway for data to be transferred from an eCig 409 to an electronic memory 414 within the charging holder 400. The charging holder 400 comprises a center contact 401 to provide one polarity of the charge signal and an outer contact 402 to provide the other polarity. The center contact 401 and the outer contact 402 can be connected to a pack battery 411 to recharge the eCig 409. The charging holder 400 can also include a third contact that can connect to a third contact 410 on the eCig 409. The third contact can allow for data transfer to occur to the electronic memory 414.

The electronic memory 414 can be operably coupled to a microcontroller 415 which can communicate with a device 412 to transfer any data stored within the charging holder 400 to the device 412. Once the data is stored within the device 412, it can then be transferred to a separate location or to the cloud 413. The device 412 can also communicate with a second electronic memory 416. While communicating with the second electronic memory 416, the device 412 can upload new software, drivers, instructions, or other desired information to be used in the operation and function of the charging holder 400. The charging holder 400 is configured to transmit and/or receive (transceive) logging data signals and control signals from/to the eCig 409 and/or device 1412.

In some embodiments it is necessary to unscrew, pull, or otherwise take the eCig apart to put the rechargeable portion of the eCig into the charging holder. In this embodiment the data logging device is included within the rechargeable portion of the eCig. Having the data logging device within this portion allows for a less expensive product as the data logging device can be re-used as the rechargeable portion can be used with multiple disposable cartomizers.

In some embodiments, using the pack as a storage and transmitter of data acquired by the data logging device can have several important advantages. The charging holder has a larger battery than the rechargeable portion of the eCig and as a result has more power to upload data to a computer, server, or other device. The charging holder can also include multiple communication options (i.e., Bluetooth, LTE, wireless, etc.). The charging holder can also comprise an increased processing power and/or a larger amount of memory within the pack. By having the data automatically download to the pack when the rechargeable portion of the eCig is placed within the pack and having the pack automatically transfer the data to a computer or other device either when a certain event occurs (e.g., when the charging holder is plugged into a computer to charge or through a Bluetooth or other broadcasting device) the user is not required to do anything different from their normal method of using the eCig and pack.

Figure 5:
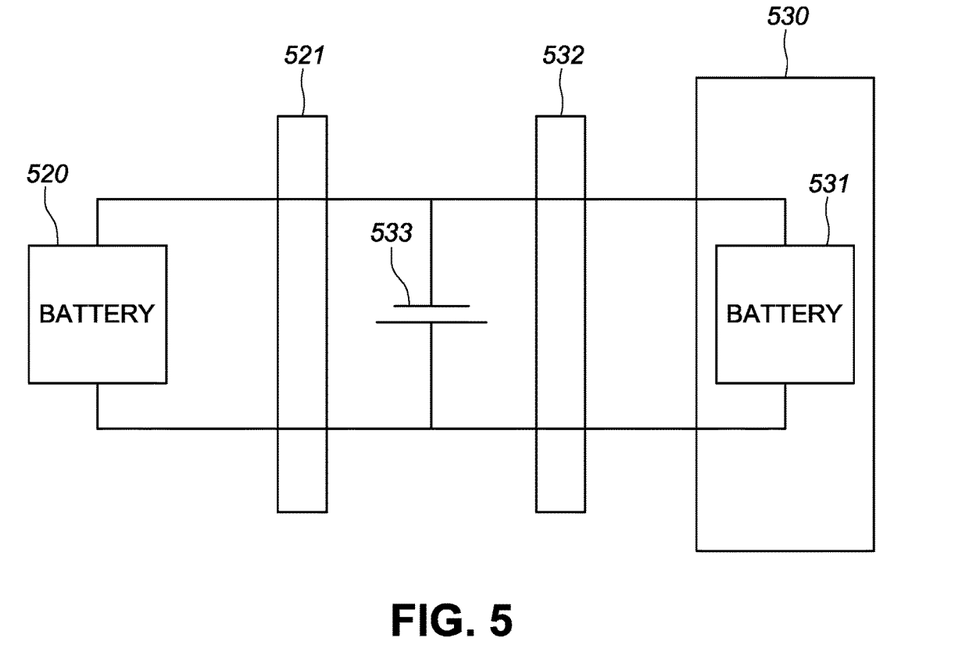
FIG. 5 depicts a diagram of a charging system including an ultra-capacitor.

FIG. 5 illustrates an embodiment of a charging system comprising an ultra-capacitor for charging an eCig battery. The charging system comprises a pack battery 520, an ultra-capacitor 533, and an eCig 530 comprising an eCig battery 531. In the illustrated embodiment the ultra-capacitor 533 can be used to charge the eCig battery 531 at an accelerated rate when compared to the charging from the pack battery 520 alone. The presently disclosed charging system can allow for a pack battery 520 to be used within the charging system that discharges at a slower rate than would otherwise be desired. This can allow for less costly batteries to be used within the pack and lead to a decreased manufacturing cost. When used as part of a charging system the ultra-capacitor 533 can be used to increase the discharge rate from that which can be achieved with an inexpensive off-the-shelf battery. This process can be used to decrease the charging time of the eCig battery 531 or to increase the amount of charge that can be transferred to an eCig battery 531 within a certain length of time. In some embodiments the charging system can also comprise a first constant voltage converter 521 and a second constant voltage converter 532. The first constant voltage converter 521 can be disposed between the ultra-capacitor 533 and the pack battery 520. The second constant voltage converter 532 can be disposed between the ultra-capacitor 533 and the eCig battery 531. The first and second constant voltage converters 521, 532 can be used to maintain constant voltage levels during discharge and charging of the batteries in the charging system.

Figure 6:
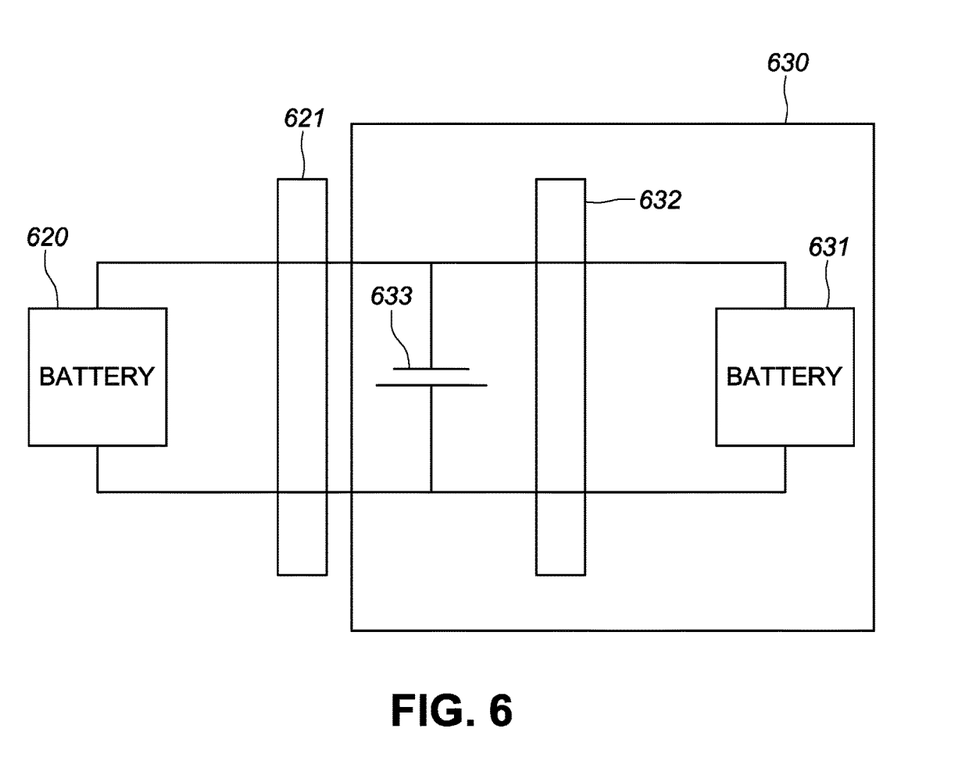
FIG. 6 depicts a diagram of a charging system including an ultra-capacitor located within an eCig.

FIG. 6 illustrates another embodiment of a charging system that can include ultra-capacitors. In this embodiment an eCig 630 can comprise an ultra-capacitor 633, an eCig battery 631, and an eCig constant voltage converter 632. The eCig 630 can be electrically coupled to a pack battery 620 that can charge the eCig battery 631. In some embodiments a pack constant voltage converter 621 can also be included within the charging system and located within the circuit between the eCig 630 and the pack battery 620. The embodiment of the charging system illustrated in FIG. 6 can be used to decrease the time required for recharging the eCig or increase the amount of charge that can be transferred in a given time frame by storing current within the ultra-capacitor 633 that can then be transferred at a slower rate to the eCig battery 631. By using the embodiment of the charging system illustrated in FIG. 6 the battery 631 of the eCig 630 can be less complicated and less expensive. This can also allow for a lower manufacturing cost with the same or increased performance as would be seen in a system using more expensive batteries.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

What is claimed:

1. An electronic cigarette body portion configured to be coupled to an electronic cigarette cartridge, the electronic cigarette body portion comprising:
    an electronic cigarette battery;
    an ultra-capacitor electrically coupled to the electronic cigarette battery;

a first voltage converter electrically coupled between the electronic cigarette battery and the ultra-capacitor; and electronic circuitry configured to temporarily or non-fixedly electrically couple the ultra-capacitor to a pack including a pack battery, wherein a second constant voltage converter is configured to be electrically coupled between the ultra-capacitor and the pack battery.

2. The electronic cigarette body portion according to claim 1, wherein the second constant voltage converter is located within the electronic cigarette.

3. The electronic cigarette body portion according to claim 1, wherein the second constant voltage converter is located within the pack.

4. The electronic cigarette body portion according to claim 1, wherein the pack battery is configured to charge the ultra-capacitor.

5. The electronic cigarette body portion according to claim 4, wherein the ultra-capacitor is configured to charge the electronic cigarette battery at an accelerated rate as compared to a rate at which the pack battery alone can charge the electronic cigarette battery.

6. The electronic cigarette body portion according to claim 1, wherein the pack further comprises a plurality of slots, at least one of the plurality of slots is configured to hold the electronic cigarette body portion or a full electronic cigarette.

7. The electronic cigarette body portion according to claim 1, wherein the electronic cigarette body portion is coupled to the electronic cigarette cartridge, the electronic cigarette cartridge including an atomizer and a container for holding a smoking liquid.

8. The electronic cigarette body portion according to claim 1, wherein the pack further comprises a push-in contact configured to releaseably couple the electronic cigarette battery to the electronic circuitry.

9. The electronic cigarette body portion according to claim 8, wherein the push in contact comprises a center contact and an outer contact and wherein the center contact is configured to provide one polarity of the charge signal and wherein the outer contact is configured to provide another polarity of the charge signal.

10. The electronic cigarette body portion according to claim 9, wherein the center contract comprises a spring-loaded pin and wherein the spring-loaded pin is configured to firmly contact a first electrical contact of the electronic cigarette battery.

11. An electronic cigarette comprising:

an electronic cigarette battery;

an ultra-capacitor electrically coupled to the electronic cigarette battery;

a first voltage converter electrically coupled between the electronic cigarette battery and the ultra-capacitor; and electronic circuitry configured to temporarily or non-fixedly electrically couple the ultra-capacitor to a pack including a pack battery, wherein a second constant voltage converter is configured to be electrically coupled between the ultra-capacitor and the pack battery.

12. The electronic cigarette according to claim 11, wherein the second constant voltage converter is located within the pack.

13. The electronic cigarette according to claim 11, wherein the pack battery is configured to charge the ultra-capacitor.

14. The electronic cigarette according to claim 13, wherein the ultra-capacitor is configured to charge the electronic cigarette battery at an accelerated rate as compared to a rate at which the pack battery alone can charge the electronic cigarette battery.

15. The electronic cigarette according to claim 11, wherein the pack further comprises a plurality of slots, at least one of the plurality of slots is configured to hold a full electronic cigarette, an electronic cigarette body portion, or an electronic cigarette cartridge.

16. The electronic cigarette according to claim 11, wherein the pack can be configured to plug into an external power source to charge the pack battery.

17. The electronic cigarette according to claim 11, wherein the electronic cigarette battery can be configured to releaseably couple to an electronic cigarette cartridge.

18. The electronic cigarette according to claim 11, wherein the pack further comprises a push-in contact configured to releaseably couple the electronic cigarette battery to the electronic circuitry.

19. The electronic cigarette according to claim 18, wherein the push in contact comprises a center contact and an outer contact and wherein the center contact is configured to provide one polarity of the charge signal and wherein the outer contact is configured to provide another polarity of the charge signal.

20. The electronic cigarette according to claim 19, wherein the center contract comprises a spring-loaded pin and wherein the spring-loaded pin is configured to firmly contact a first electrical contact of the electronic cigarette battery.

* * * * *